(12) United States Patent
Kim et al.

(10) Patent No.: US 8,483,874 B2
(45) Date of Patent: Jul. 9, 2013

(54) PATH PLANNING APPARATUS OF ROBOT AND METHOD AND COMPUTER-READABLE MEDIUM THEREOF

(75) Inventors: Myung Hee Kim, Suwon-si (KR); San Lim, Suwon-si (KR); Kyung Shik Roh, Seongnam-si (KR); Bok Man Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 303 days.

(21) Appl. No.: 12/903,653

(22) Filed: Oct. 13, 2010

(65) Prior Publication Data

US 2011/0106306 A1 May 5, 2011

(30) Foreign Application Priority Data

Nov. 2, 2009 (KR) .................. 10-2009-0105087

(51) Int. Cl.
*G05B 19/18* (2006.01)
(52) U.S. Cl.
USPC ............................................. 700/246; 341/79

(58) Field of Classification Search
USPC ............ 700/246, 255, 262, 250, 253; 341/79; 701/400, 408–411, 479, 300, 301; 318/567, 318/568.21, 568.22
See application file for complete search history.

(56) References Cited

U.S. PATENT DOCUMENTS

| | | | | |
|---|---|---|---|---|
| 4,772,831 A | * | 9/1988 | Casler et al. | 318/568.15 |
| 6,493,607 B1 | * | 12/2002 | Bourne et al. | 700/255 |
| 7,605,347 B2 | * | 10/2009 | Izawa et al. | 219/124.34 |
| 8,185,265 B2 | * | 5/2012 | Nagano | 701/25 |

* cited by examiner

*Primary Examiner* — Dalena Tran
(74) *Attorney, Agent, or Firm* — Staas & Halsey LLP

(57) ABSTRACT

A path planning apparatus of a robot smoothes a motion path while satisfying a constraint. In a configuration space where a manipulator of a robot performs a task, a Rapidly-exploring Random Tree (RRT) path which extends from a start point and reaches a goal point may be smoothed while satisfying a constraint to generate a stable motion path. Accordingly, path planning performance is improved and an optimal path satisfying a kinematic constraint may be rapidly obtained.

16 Claims, 23 Drawing Sheets

(a)　　　　　　　　(b)

PATH PLANNING APPARATUS OF ROBOT AND METHOD AND COMPUTER-READABLE MEDIUM THEREOF

CROSS-REFERENCE TO RELATED APPLICATIONS

This application claims the benefit of Korean Patent Application No. 2009-0105087, filed on Nov. 2, 2009 in the Korean Intellectual Property Office, the disclosure of which is incorporated herein by reference.

BACKGROUND

1. Field

Example embodiments relate to a path planning apparatus smoothing a motion path while satisfying a constraint, and a method and computer-readable medium thereof.

2. Description of the Related Art

In general, a mechanical device which performs motion similar to human motion using an electrical or magnetic mechanism is called a robot. Early robots included manipulators used for automated or unmanned tasks in manufacturing plants or industrial robots such as transportation robots. Robots also performed dangerous tasks, repetitive tasks or tasks requiring a large amount of force. Recently, research has been actively conducted into a humanoid robot, which has joints similar to those of a human, and coexists with a human in a working and living space of the human and to provide various services.

Such a humanoid robot performs tasks using a manipulator which may move similar to the arm or hand motion of a human using an electrical or mechanical mechanism. In most manipulators which are currently in use, several links are connected to each other. A connection portion between the links is called a joint. The motion characteristics of the manipulator are determined according to a geometrical relationship. Mathematical representation of such a geometrical relationship is called kinematics. In general, the manipulator moves an end effector of a robot with such kinematic characteristics in a direction (goal point) to perform a task.

In order to allow the manipulator to perform a given task (e.g., grasp an object), it is important to generate a motion path of the manipulator from an initial position (start point) before the manipulator performs a task to a final position (goal point) where the task may be performed, for example, where an object may be grasped. An example of a sampling based path planning method of planning a path to connect a start point and a goal point while satisfying a constraint such as collision avoidance where a manipulator does not collide with an obstacle within a working area includes a Rapidly-exploring Random Tree (RRT) algorithm.

The RRT algorithm uses a randomly sampled configuration in a Configuration Space (C-Space), where a manipulator or a humanoid robot performs a task. An example of the RRT algorithm includes a method of repeating a process of selecting a closest node from an initial start point to extend a tree and searching for a motion path to find a goal point. A node having a smallest goal score is selected from the tree using a goal function composed of a function of a distance from the goal point to an end-effector and a directional vector to extend the tree.

However, in the RRT algorithm of the related art, when a closest node is selected to extend a tree to reach a final goal point, the tree is extended to satisfy a given goal score condition and avoid obstacles. In this case, since the tree may substantially extend in a vertical direction, a detour or zigzag path may be unnecessarily generated. Accordingly, a motion distance of a manipulator or a humanoid robot is increased and the motion of the manipulator or the humanoid robot may be rapidly changed.

SUMMARY

Therefore, it is an aspect of the example embodiments to provide a path planning apparatus of a robot, which smoothes a path generated using a Rapidly-exploring Random Tree (RRT) algorithm while satisfying a constraint, and a method and computer-readable medium thereof.

The foregoing and/or other aspects are achieved by providing a method of planning a path of a robot, the method including forming, by at least one processor, a configuration space having a start point, a goal point and a constraint to generate a motion path of a manipulator of the robot, generating, by the at least one processor, a Rapidly-exploring Random Tree (RRT) path connecting the start point and the goal point while satisfying the constraint on the configuration space, generating, by the at least one processor, an intermediate path connecting two certain points selected from the RRT path, projecting, by the at least one processor, the intermediate path and determining when the constraint on the configuration space is satisfied and storing, by the at least one processor, the two certain points in the RRT path to smooth the RRT path if the constraint on the configuration space is satisfied.

The start point may be a node obtained by forming a configuration on the configuration space at an initial position before the manipulator of the robot performs a task.

The goal point may be a node obtained by forming a configuration on the configuration space at a goal position where the manipulator of the robot performs a task.

The projecting of the intermediate path may include obtaining a constraint on a working space of the manipulator of the robot, comparing the constraint on the working space with the constraint on the configuration space to calculate an error on the working space, and projecting nodes of the intermediate path to correct the error on the working space.

The nodes of the intermediate path may be a plurality of nodes obtained by dividing the intermediate path by a constant interval.

The determining of whether the constraint on the configuration space may be satisfied includes determining whether the nodes of the intermediate path satisfy the constraint on the configuration space.

The foregoing and/or other aspects are achieved by providing a method of planning a path of a robot, the method including forming, by at least one processor, a configuration space having a start point, a goal point and a constraint to generate a motion path of a manipulator of the robot, generating, by the at least one processor, a Rapidly-exploring Random Tree (RRT) path connecting the start point and the goal point while satisfying the constraint on the configuration space, low-pass filtering, by the at least one processor, the overall RRT path, projecting, by the at least one processor, the low-pass filtered path and determining if the constraint on the configuration space is satisfied and storing, by the at least one processor, the projected path in the RRT path to smooth the RRT path if the constraint on the configuration space is satisfied.

The projecting of the low-pass filtered path may include obtaining a constraint on a working space of the manipulator of the robot, comparing the constraint on the working space with the constraint on the configuration space to calculate an error on the working space, and projecting nodes of the low-pass filtered path to correct the error on the working space.

The nodes of the low-pass filtered path may be all nodes on the low-pass filtered path.

The foregoing and/or other aspects are achieved by providing an apparatus planning a path of a robot, the apparatus including a recognizer configured to recognize a start point and a goal point respectively corresponding to an initial configuration and a goal configuration of a manipulator of the robot and a path planning generator configured to form a configuration space to generate a motion path of the manipulator of the robot, to generate a Rapidly-exploring Random Tree (RRT) path connecting the start point and the goal point while satisfying a constraint on the configuration space, and to project the RRT path on a working space of the manipulator of the robot to smooth the RRT path.

The path planning generator may generate an intermediate path connecting two certain points selected from the RRT path, project nodes obtained by dividing the intermediate path by a constant interval responsive to the constraint on the configuration space, and store the two certain points in the RRT path to smooth the RRT path if the nodes of the intermediate path satisfy the constraint on the configuration space.

The path planning generator may low-pass filter the overall RRT path, project the low-pass filtered path responsive to the constraint on the configuration space, and store the projected path in the RRT path to smooth the RRT path if the projected path satisfies the constraint on the configuration space.

According to the apparatus, method and computer-readable medium planning the path of the robot, in a configuration space where a manipulator of a robot performs a task, a Rapidly-exploring Random Tree (RRT) path which extends from a start point and reaches a goal point is smoothed while satisfying a constraint to generate a stable motion path. Accordingly, path planning performance is improved and an optimal path satisfying a kinematic constraint may be rapidly obtained.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
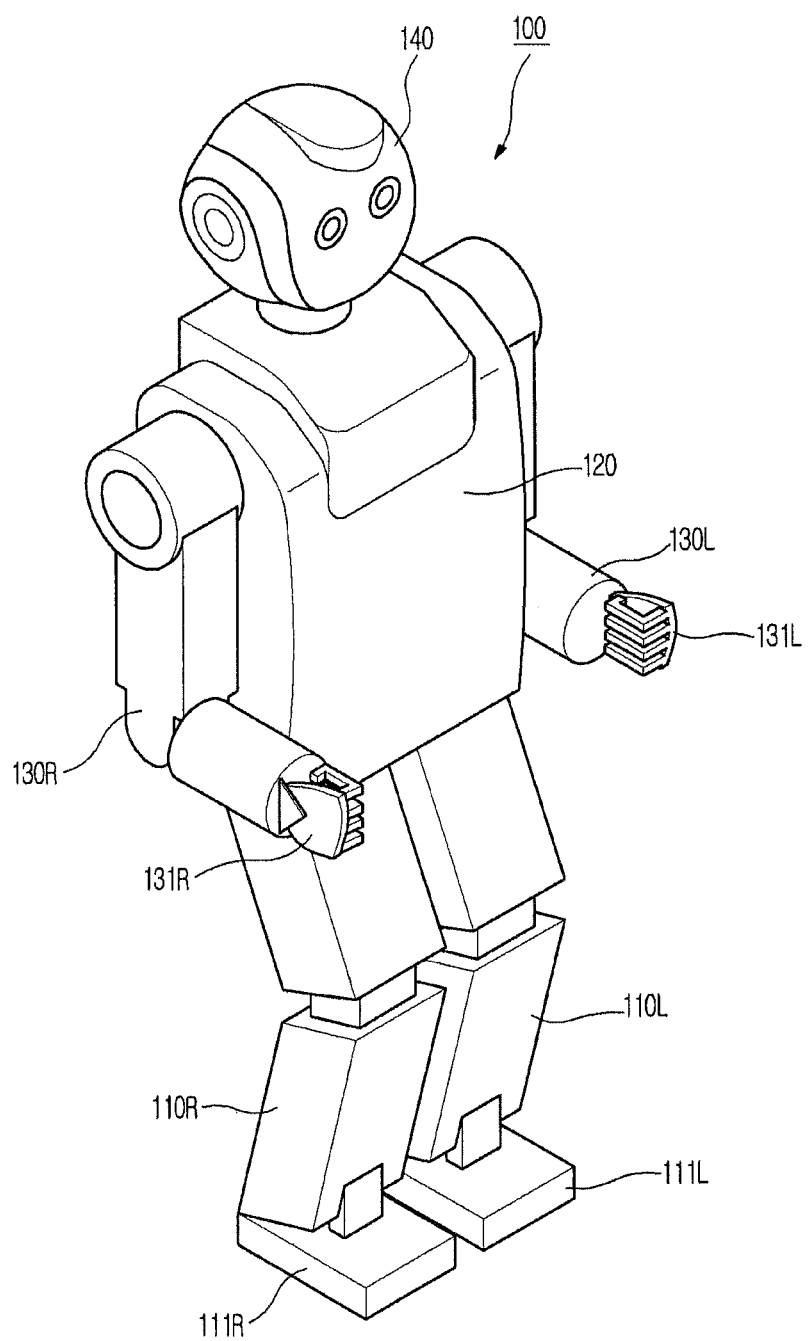
FIG. 1 is an appearance view showing an example of a robot according to example embodiments.

Reference will now be made in detail to embodiments, examples of which are illustrated in the accompanying drawings, wherein like reference numerals refer to like elements throughout.

FIG. 1 is an appearance view showing an example of a robot according to example embodiments.

In FIG. 1, the robot 100 according to example embodiments is a bipedal robot which walks erect using two legs 110R and 110L similar to a human, and includes a trunk 120, two arms 130R and 130L and a head 140 mounted on an upper side of the trunk 120, and feet 111R and 111L and hands 131R and 131L respectively mounted on the front ends of the two legs 110R and 110L and the arms 130R and 130L.

In reference numerals, R and L denote right and left, respectively.

Figure 2:
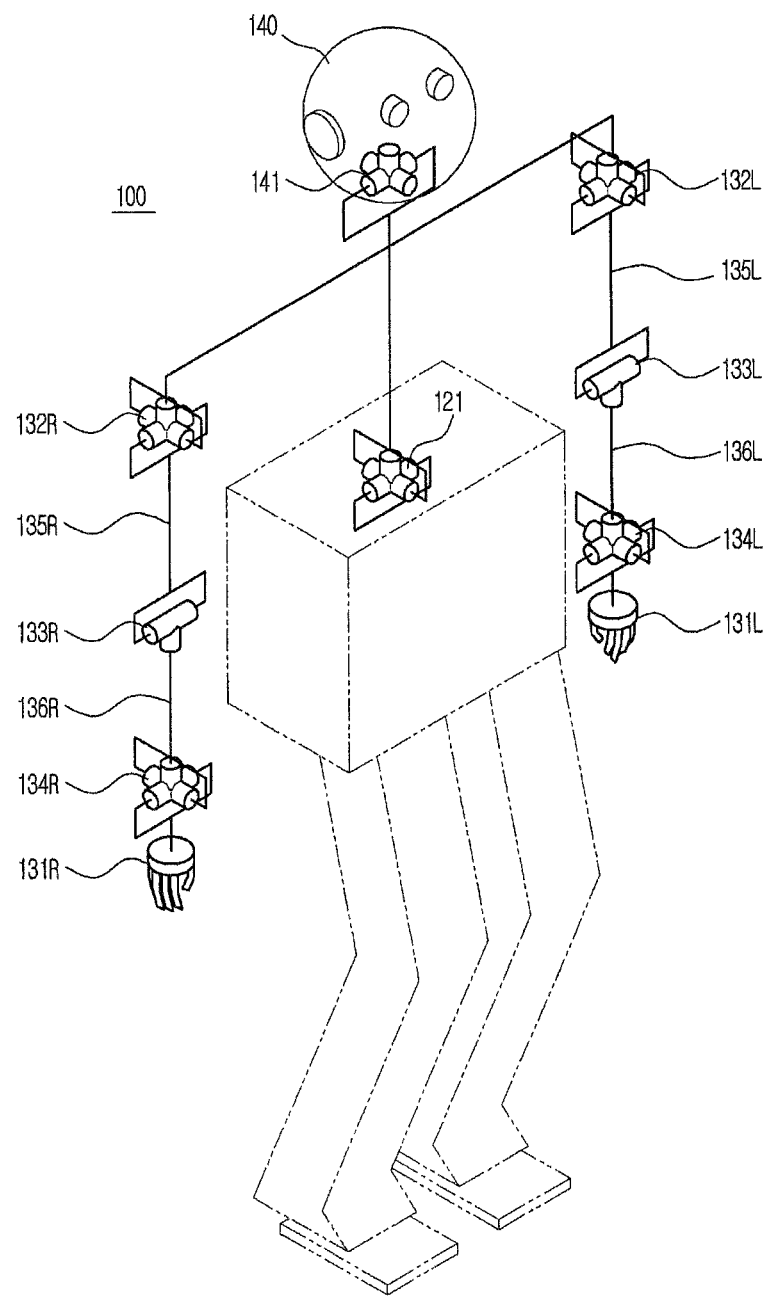
FIG. 2 is a view showing the structure of the main joints of the robot shown in FIG. 1.

FIG. 2 is a view showing the structure of the main joints of the robot shown in FIG. 1.

In FIG. 2, the two arms 130R and 130L respectively include shoulder joints 132R and 132L, elbow joints 133R and 133L and wrist joints 134R and 134L which allow the portions corresponding to the shoulders, the elbows and the wrists of the robot 100 to rotate. The shoulder joints 132R and 132L are located on both ends of the upper side of the trunk 120.

The shoulder joints 132R and 132L of the arms 130R and 130L may move in an x axis (roll axis), a y axis (pitch axis) and a z axis (yaw axis), the elbow joints 133R and 133L may move in the y axis (pitch axis), and the wrist joints 134R and 134L may move in the x axis (roll axis), the y axis (pitch axis) and the z axis (yaw axis).

The two arms 130R and 130L respectively include upper links 135R and 135L to connect the shoulder joints 132R and 132L and the elbow joints 133R and 133L and lower links 136R and 136L to connect the elbow joints 133R and 133L and the wrist joints 134R and 134L to move with a predetermined degree of freedom according to the movable angle ranges of the joints 132R and 132L, 133R and 133L, and 134R and 134L.

The trunk 120 connected to the two legs 110R and 110L includes a waist joint 121 to rotate the portion corresponding to the waist of the robot 100, and the head 140 connected to the trunk 120 includes a neck joint 141 to rotate the portion corresponding to the neck of the robot 100.

In the example embodiments, the two arms 130R and 130L configure a manipulator 130 to perform a motional task, and the two hands 131R and 131L provided on the front end of the manipulator 130 configure an end effector 131 to grasp an object. These are schematically shown in FIG. 3.

Figure 3:
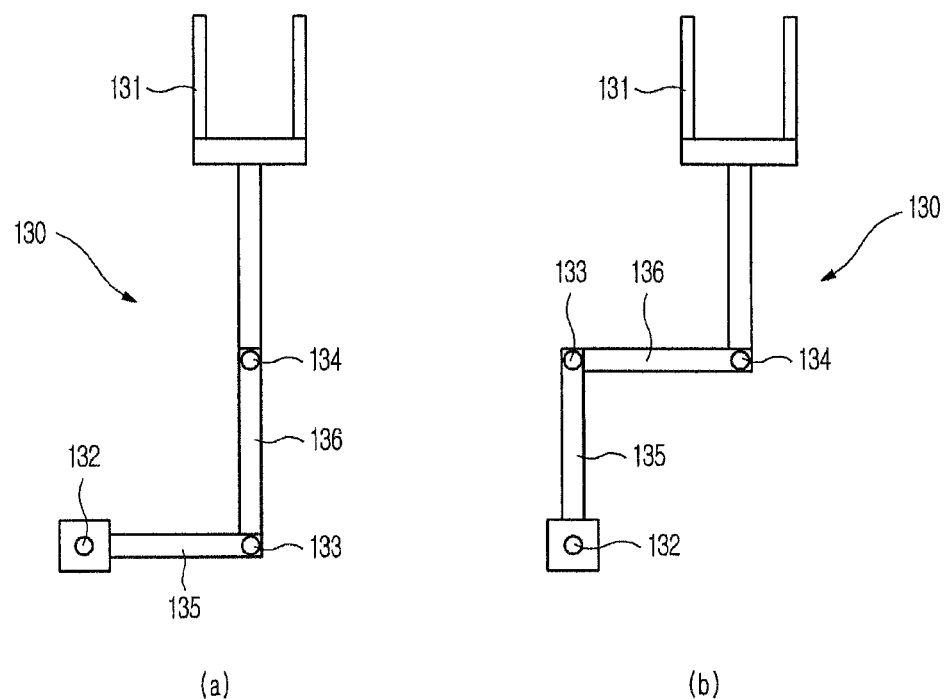
FIG. 3 is a view schematically showing the configuration of a kinematic redundant actuation manipulator of a robot according to example embodiments.

FIG. 3 is a view schematically showing the configuration of a kinematic redundant actuation manipulator of a robot according to example embodiments.

In FIG. 3, the manipulator 130 is manufactured to move similar to the arm or hand motion of a human by an electrical or mechanical mechanism. In most manipulators 130 which are currently in used, several links 135 and 136 (in detail, an upper link or a lower link) are connected to each other by several joints 132, 133 and 134 (in detail, shoulder joints, elbow joints or wrist joints). The motional characteristics of the manipulator 130 are determined according to a geometrical relationship between the links 135 and 136 and the joints 132, 133 and 134. Mathematical representation of such a geometrical relationship is kinematics. In general, the manipulator 130 moves the end effector 131 with such kinematic characteristics in a direction to perform a task. The manipulator 130 according to example embodiments moves the end effector 131 to a goal point to grasp an object using links 135 and 136, the positions and directions of which are adjusted.

As shown in FIG. 3, the shape of the manipulator 130 which moves to the goal point in order to grasp the same object may be variously changed as shown in FIG. 3A or 3B.

Figure 4:
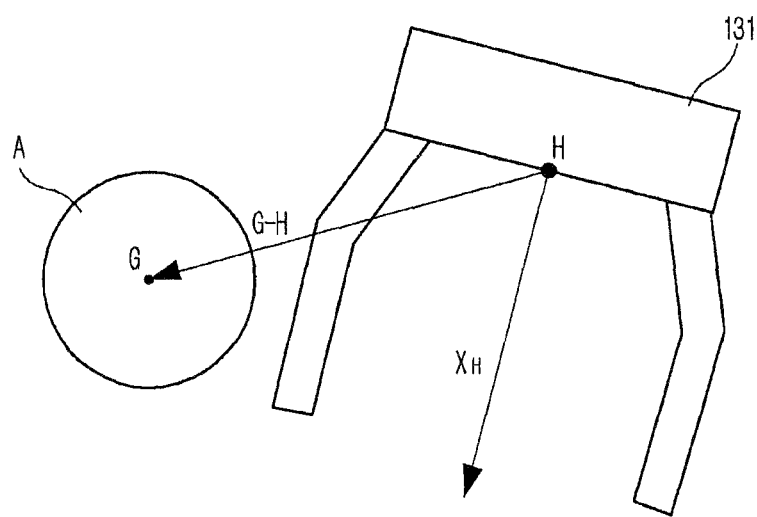
FIG. 4 is a view of a model of a process of grasping an object by the manipulator of FIG. 3.

FIG. 4 is a view of a model of a process of grasping an object by the manipulator of FIG. 3.

In FIG. 4, a goal function which is satisfied when the manipulator 130 grasps a goal object A is expressed by Equation 1.

$$\text{Goal Function} = \|G-H\| + \alpha * |(G-H) * x_H - 1| \quad \text{Equation 1}$$

where, G denotes a goal point to grasp the object A by the manipulator 130, H is a center of the end effector 131, $\|G-H\|$ denotes a distance from the end effector 131 to the goal point G, $|(G-H)*x_H 1|$ denotes a directional vector, and a denotes a constant.

Figure 5:
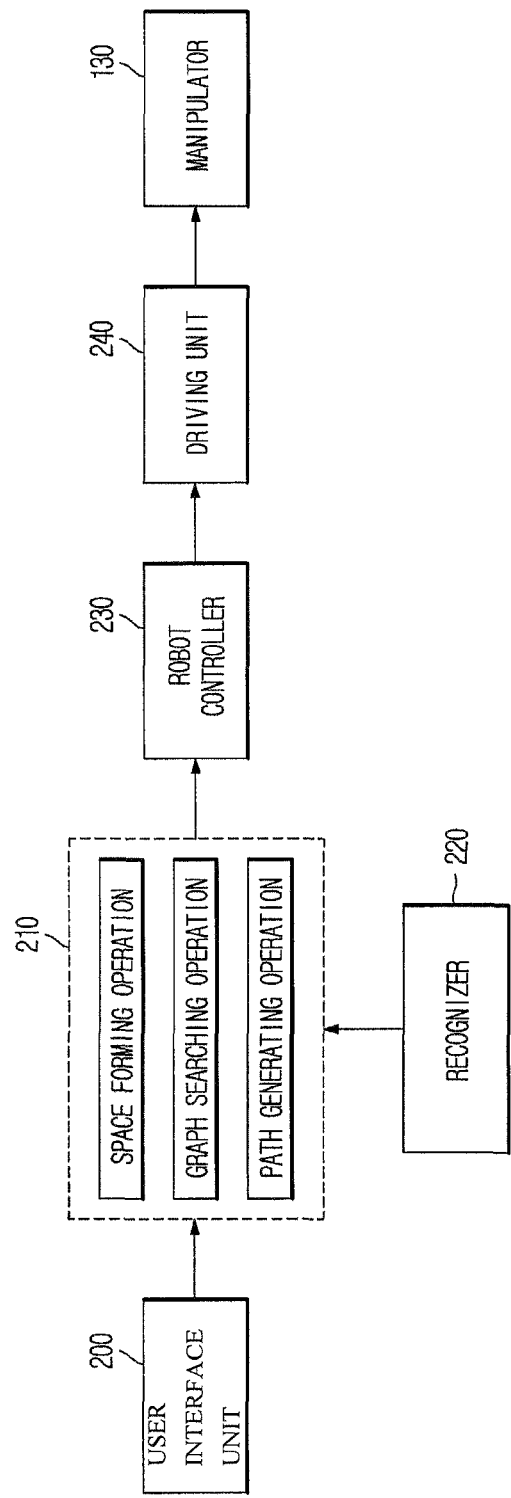
FIG. 5 is a control block diagram of an apparatus planning a motion path of a manipulator of a robot according to example embodiments.

FIG. 5 is a control block diagram of an apparatus planning a motion path of a manipulator of a robot according to example embodiments, which includes a user interface unit 200, a path planning generator 210, a recognizer 220, a robot controller 230, and a driving unit 240.

The user interface unit 200 allows a user to input a task command (e.g., a grasping command to grasp an object placed on a table) of the robot 100 and, more particularly, the manipulator 130, by manipulating a switch or via voice.

The path planning generator 210 generates a path plan to control the motion of the manipulator 130 while satisfying a constraint according to the task command input via the user interface unit 200 and sends the path plan to the robot controller 230. A method of generating a path plan by the path plan generator 210 includes a space forming operation, a graph searching operation and a path generating operation.

In the space forming operation, a Configuration Space (C-Space) to smoothly generate a path while satisfying a constraint such as collision avoidance of an obstacle or a movable angle range (joint limit) of the joints 132, 133 and 134 is detected. The term "configuration" refers to a set of variables to represent the position and the direction of the moving manipulator 130, and all spaces occupied by configurations are called the C-Space.

In the graph searching operation, a connected network representing a searchable path to generate an optimal path is generated. Configurations are randomly extracted based on the C-Space formed by a cell decomposition method, such as a tree, with respect to the moving manipulator 130, nodes are generated by a method of excluding a configuration colliding with an obstacle space, and a search tree connecting the generated nodes is generated, thereby obtaining a search graph to generate a path.

In the path generation operation, an obstacle space is avoided to avoid a collision in the connected network of the given search space, and a path is smoothly generated which connects a start point and a goal point while satisfying a constraint.

The recognizer 220 recognizes information which is given in order to perform a task command by the manipulator 130, for example, a configuration (start point) at an initial position of the manipulator 130 before performing the task command, a configuration (goal point) at a goal point of the manipulator 130 where the task command may be performed, and obstacles in the C-space between the start point and the goal point. The recognizer 220 sends the information to the path plan generator 210. This recognized information is used to plan the motion path of the manipulator 130 by the path plan generator 210.

The robot controller 230 controls the driving unit 240 according to the path plan received from the path plan generator 210, drives the manipulator 130, and controls the motion of the manipulator 130.

Hereinafter, the robot having the above-described structure, the method of planning the path thereof, and the effects thereof will be described.

Figure 6:
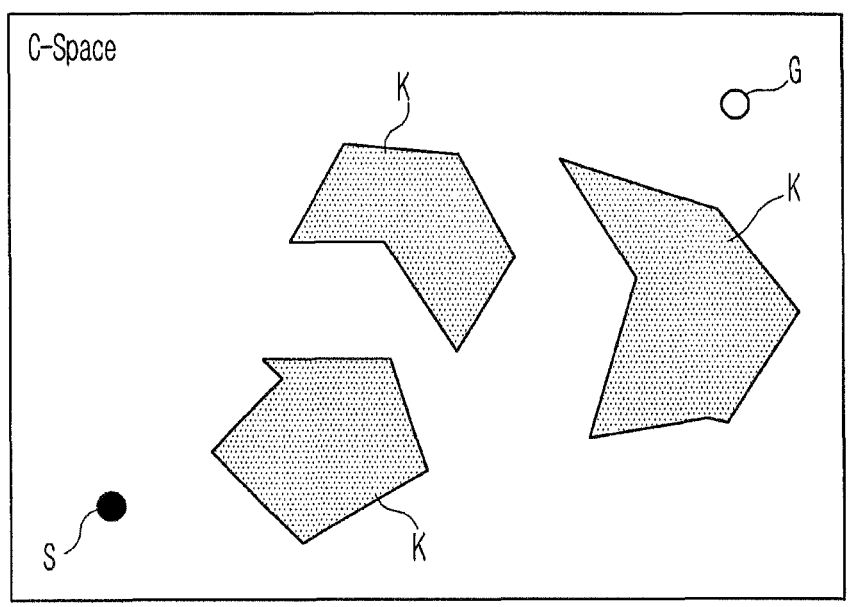
FIG. 6 is a view showing a configuration space according to example embodiments.

FIG. 6 is a view showing a C-Space according to example embodiments.

In FIG. 6, the C-Space is a dynamic space where the manipulator 130 performs a task. S denotes a start point of the configuration of an initial position before the manipulator 130 performs the task by one node in the C-Space. G denotes a goal point. The configuration of a goal position where the manipulator 130 may perform the task such as grasping an object is formed by one node in the C-space. K denotes a C-Space of an obstacle between the start point S and the goal point G.

An example of a method of planning a path while satisfying a constraint such as collision avoidance of an obstacle K or joint limit, includes a sampling based motion planning method. An example of such a method includes a Rapidly-exploring Random Tree (RRT) method.

The RRT algorithm detects a path of the manipulator 130 having a tree T formed by one node which is visualized and a constraint such as collision avoidance of the obstacle K or joint limit satisfied from the start point S to the goal point G. The extension of the tree T is performed by selecting a closest node from nodes belonging to the tree T in a certain point g randomly sampled in the C-Space, connecting a virtual line, including a sample $g_{new}$ in the tree if the sample $g_{new}$ in the virtual line satisfies the constraint, and continuously extending the tree T until the sample $g_{new}$ reaches the goal point G. The path plan generation of the example embodiments using the RRT algorithm will be described in detail with reference to FIGS. 7 to 12.

FIGS. 7 to 12 are views of a process of generating a tree in a C-Space according to example embodiments.

Figure 9:
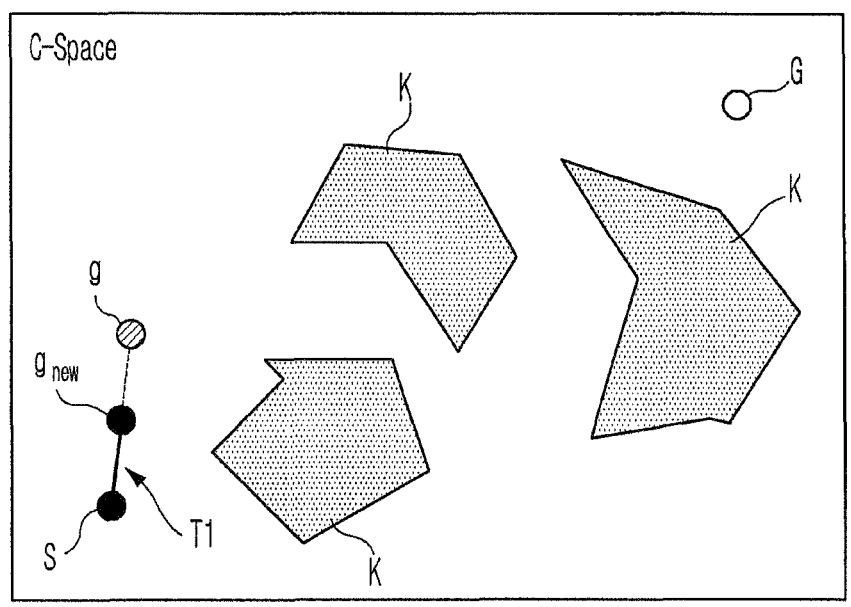
Figure 10:
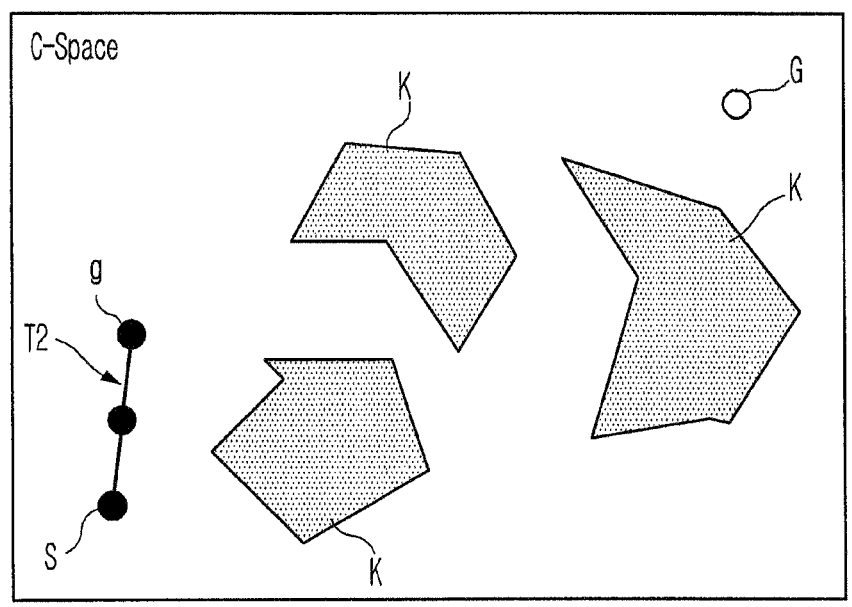

In the C-Space, the start point S, the goal point G and the obstacle K are displayed, a certain point g is randomly sampled (see FIG. 7), the randomly sampled point g and a node having a smallest goal score are connected by a dotted virtual line, a new sample $g_{new}$ separated from the start point by a predetermined distance is generated (see FIG. 8), the constraint (joint limit, collision avoidance or the like) and a goal score of the new sample $g_{new}$ are checked, and the new sample $g_{new}$ is added to the tree T1 if the constraint and the goal score condition are satisfied (see FIG. 9). The above-described process is repeatedly performed until the new sample $g_{new}$ is constantly extended and the tree T1 is extended to a tree T2 (see FIG. 10)

Figure 11:
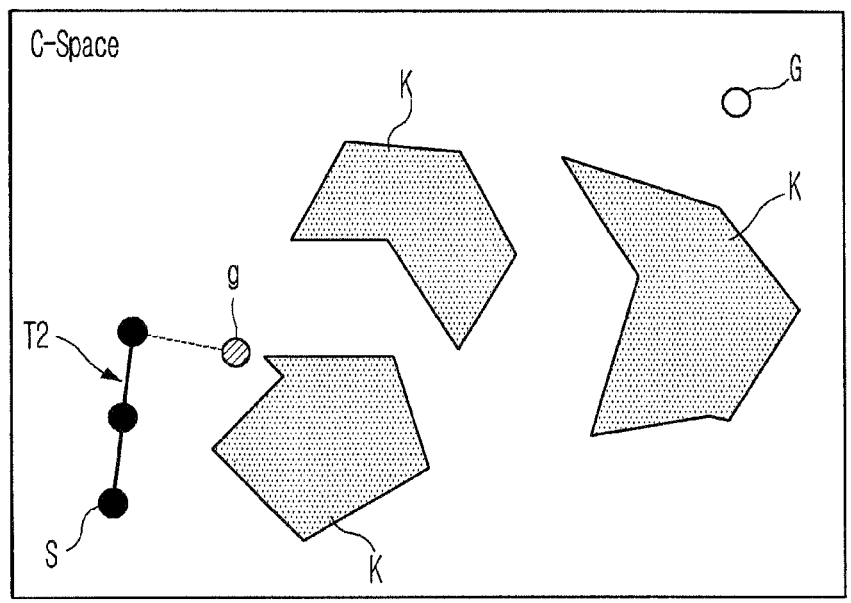
Figure 12:
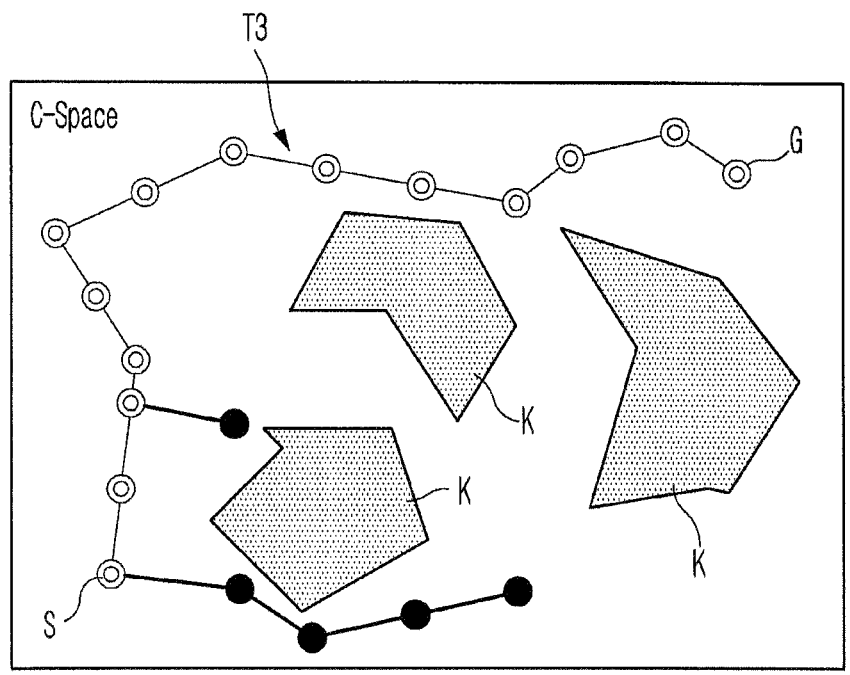

The tree extension process shown in FIGS. 7 to 10 is repeatedly performed to add new samples $g_{new}$ to the tree and a tree is extended (see FIGS. 11 and 12). Such a process is repeatedly performed and the extended sample $g_{new}$ advances toward the goal point G. At this time, if the extended sample $g_{new}$ satisfies a goal function, the graph searching operation is performed to form the motion path of the manipulator 130.

During the tree extension of the RRT algorithm, if the sample $g_{new}$ satisfies the constraint (collision avoidance, joint limit or the like) and the goal score condition when a node extends a tree to reach a final goal point G, the sample $g_{new}$ is included in the tree to extend the tree. Therefore, in this case, the tree may substantially extend in a vertical direction as shown in FIG. 12 and a detour or zigzag path may be unnecessarily generated.

Figure 13:
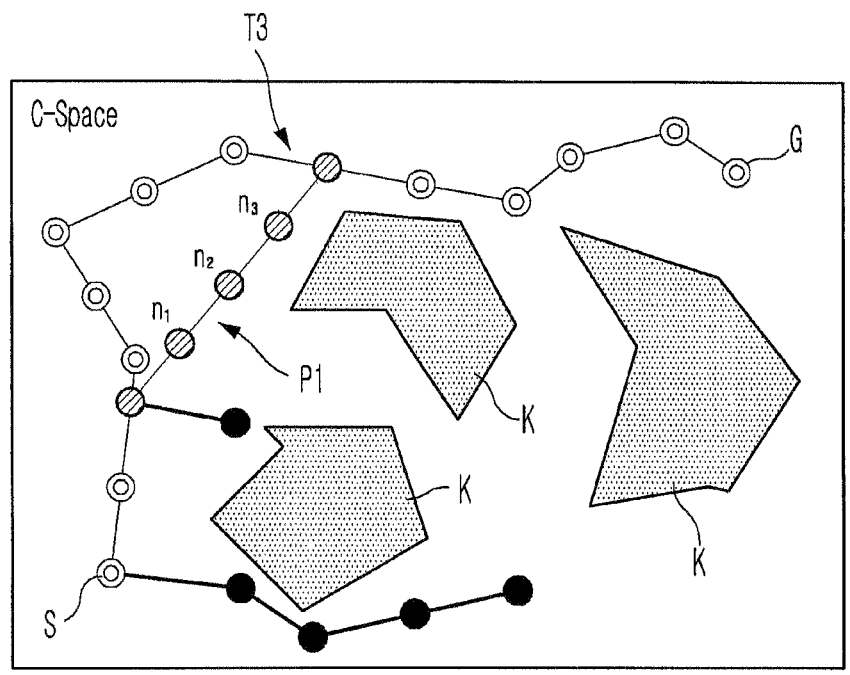
FIG. 13 is a view of an example of a process of generating an intermediate path to smooth a Rapidly-exploring Random Tree (RRT) path according to example embodiments.

Accordingly, the example embodiments suggest a method of smoothing an RRT path satisfying the constraint (collision avoidance, joint limit or the like). Two certain points are selected from the RRT path, an intermediate path P1 connecting the certain points is generated, the intermediate path P1 is divided by a constant interval to obtain nodes $n_1$, $n_2$ and $n_3$, a determination is made whether or not the nodes $n_1$, $n_2$ and $n_3$ satisfy the constraint, the two certain points are inserted into the RRT path if the nodes $n_1$, $n_2$ and $n_3$ satisfy the constraint, and the intermediate path P1 of a shortcut is stored (see FIG. 13).

Figure 14:
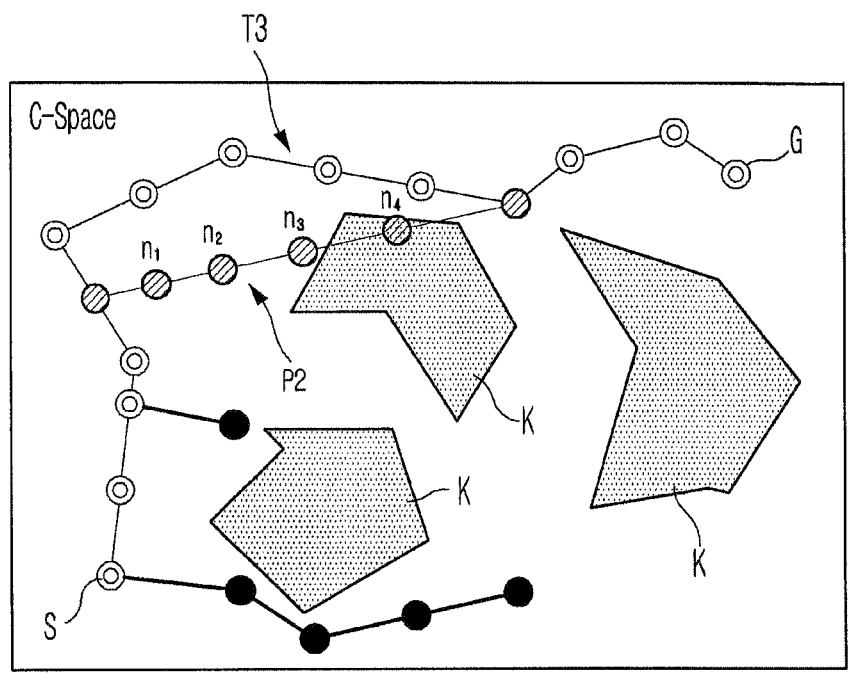
FIG. 14 is a view of another example of a process of generating an intermediate path to smooth an RRT path according to example embodiments.

However, nodes $n_1$, $n_2$, $n_3$ and $n_4$ obtained by dividing an intermediate path P2 connecting two certain points selected from the RRT path by a constant interval may not satisfy the constraint (see FIG. 14). While the two certain points are discarded in the related art, the intermediate path P2 connecting the two certain points is projected to satisfy the constraint in the example embodiments.

Figure 15:
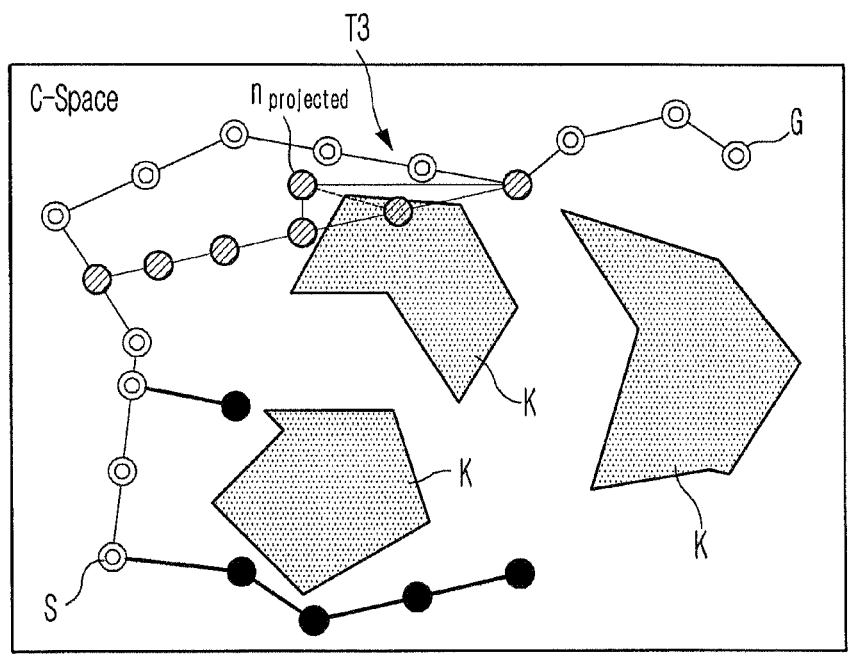
FIG. 15 is a view of a process of projecting an intermediate path to smooth an RRT path according to example embodiments.

FIG. 15 is a view of a process of projecting an intermediate path in order to smooth an RRT path according to example embodiments.

In FIG. 15, among the nodes $n_1$, $n_2$, $n_3$ and $n_4$ obtained by dividing the intermediate path P2 connecting the two certain points by the constant interval, one node $n_4$ is projected to satisfy the constraint on a working space.

The method of projecting the node $n_4$ to satisfy the constraint on the working space is expressed by Equation 2.

$$N_{projected} = n_4 - J^{-1} \Delta X_{error}$$

$$\Delta X_{error} = J \Delta n_4 \qquad \text{Equation 2}$$

In Equation 2, J denotes Jacobian, and $\Delta X_{error}$ denotes an error on the working space. The error on the working space is calculated by obtaining a constraint on the working space of the manipulator 130 and comparing the constraint on the working space and the constraint on the C-Space. In addition, $\Delta n_4$ denotes a vector of joints at the node $n_4$. There may be 3 to 7 joints according to a degree of freedom.

After the node $n_4$ is projected by Equation 2 in order to correct the error on the working space, it is determined whether a projected node $n_{projected}$ satisfies the constraint. If the projected node $n_{projected}$ satisfies the constraint, the two certain points are inserted into the path and a shortcut path is stored.

Although one node $n_4$ of the nodes $n_1$, $n_2$, $n_3$ and $n_4$ of the intermediate path P2 is projected to satisfy the constraint in FIG. 15, all the nodes $n_1$, $n_2$, $n_3$ and $n_4$ of the intermediate path P2 may be projected.

The process of smoothing the RRT path while satisfying the constraint by the projection of the intermediate path P2 will be described with reference to FIG. 16.

Figure 16:
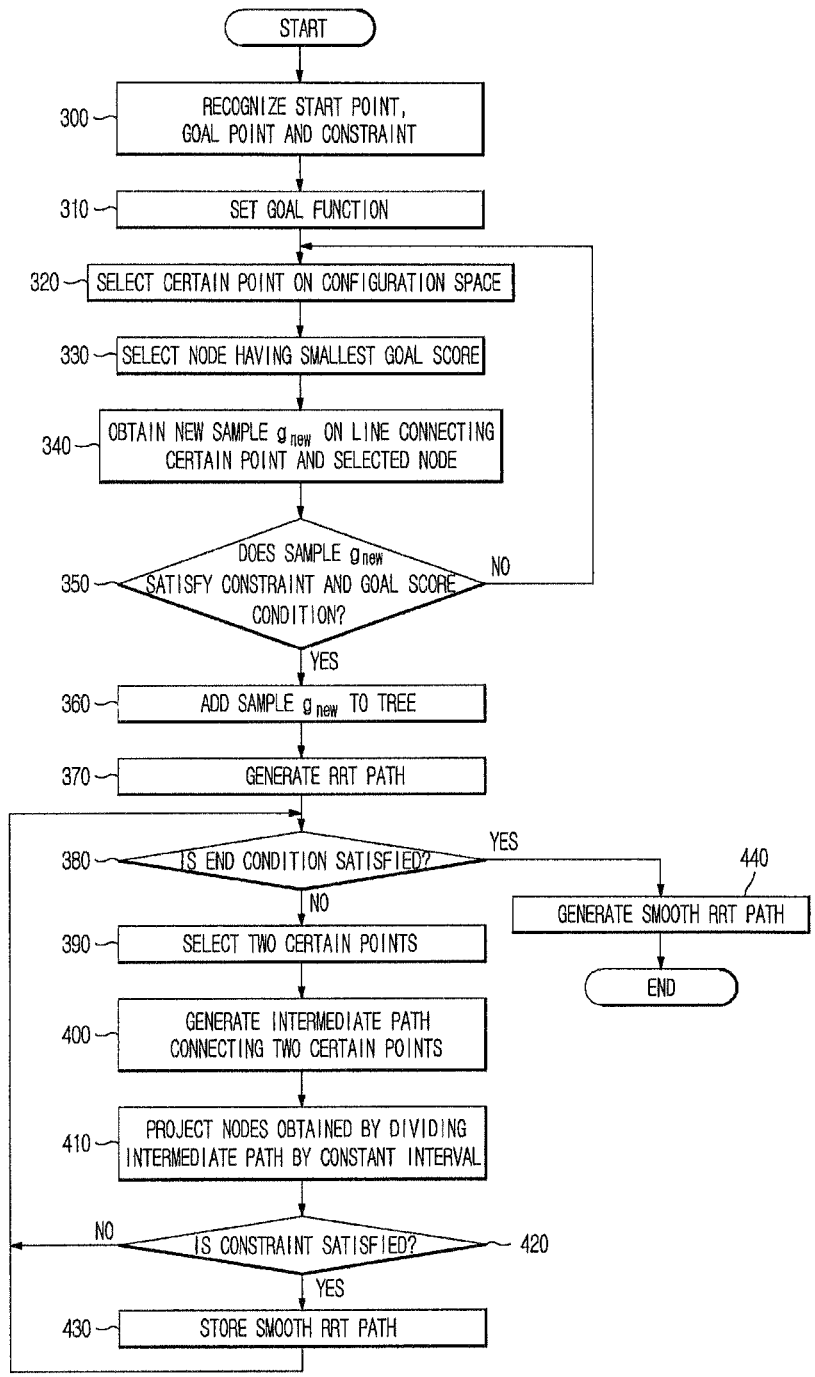
FIG. 16 is a flowchart illustrating a method of smoothing an RRT in a robot according to example embodiments.

FIG. 16 is a flowchart illustrating a method of smoothing an RRT in a robot according to example embodiments.

In FIG. 16, the path planning generator 210 recognizes information, which is given in order to enable the manipulator 130 to perform a task command, for example, a configuration (start point S) at an initial position of the manipulator 130 before performing the task command, a configuration (goal point G) of a goal position of the manipulator 130 where the task command may be performed, a constraint (collision avoidance, joint limit or the like) to avoid obstacles K placed between the start point S and the goal point G in a C-space using the recognizer 220 (300; see FIG. 6).

In addition, the path planning generator 210 sets a goal function which is a function according to a distance between the start point S and the goal point G and a directional difference thereof using Equation 1 (310).

Figure 7:
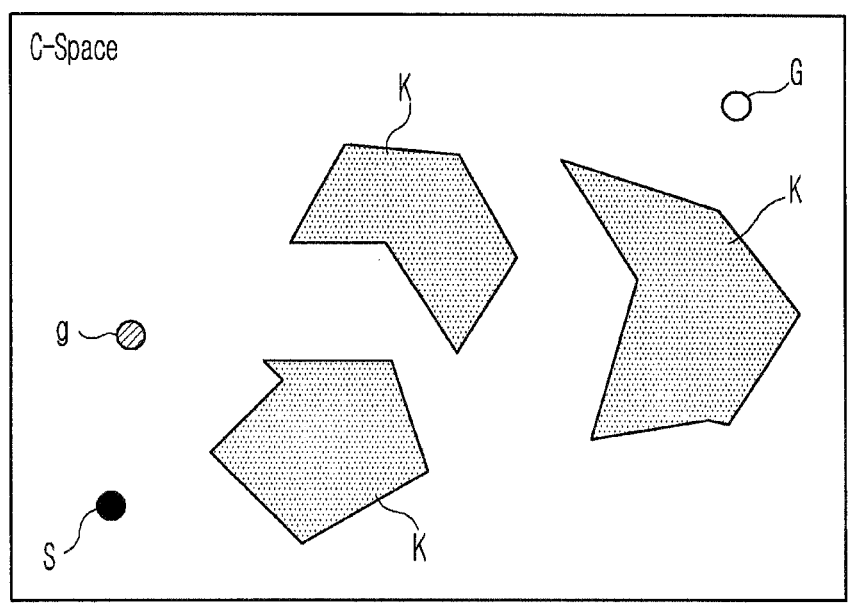
FIGS. 7 to 12 are views of a process of generating a tree in a configuration space according to example embodiments.
Figure 8:
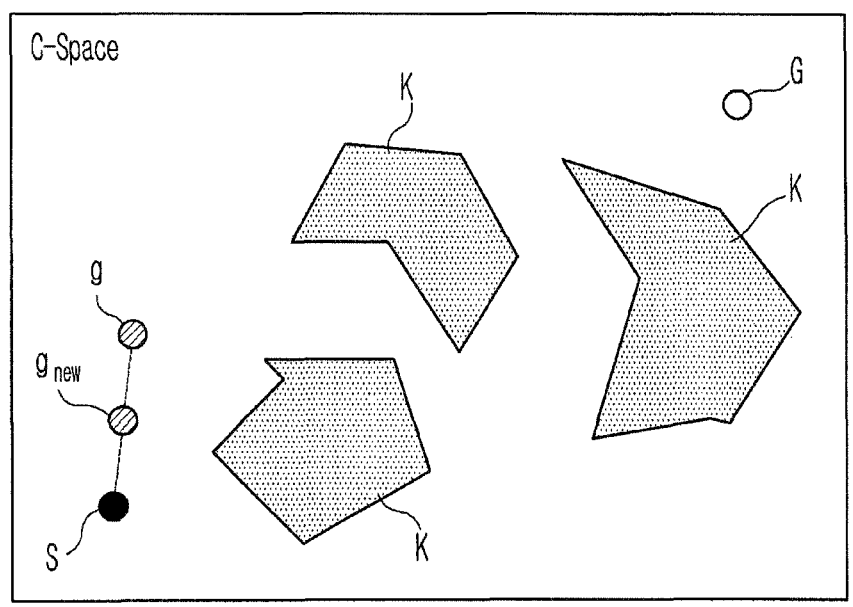

Subsequently, the path planning generator 210 randomly samples a certain point g where a tree is generated in order to plan a motion path satisfying the constraint in the C-Space with the recognized start point S, goal point G and constraint (320; see FIG. 7).

A node having a smallest goal score is selected from nodes belonging to the tree T in the randomly sampled certain point g (330). The randomly sampled certain point g and the node having the smallest goal score are connected by a dotted virtual line and a new sample $g_{new}$ separated from the certain point by a predetermined distance is obtained (340; see FIG. 8).

In addition, the constraint (collision avoidance, joint limit or the like) and the goal score of the new sample $g_{new}$ are checked to determine whether the constraint and the goal score condition are satisfied (350).

If it is determined that the sample $g_{new}$ satisfies the constraint and the goal score condition in operation 350, then the new sample $g_{new}$ is added to the tree (360; see FIG. 9). The above-described process is repeatedly performed until the new sample $g_{new}$ is constantly extended (see FIG. 10).

The tree extension process is repeatedly performed to add new samples $g_{new}$ to the tree to generate the RRT path of the manipulator 130, as shown in FIG. 12 (370). The generated RRT path may substantially extend in the vertical direction to become a detour or zigzag path.

Accordingly, the path planning generator 210 determines whether an end condition (maximum repetition number and maximum time) is satisfied in order to smooth the RRT path while satisfying the constraint (380).

If it is determined that the end condition is not satisfied in operation 380, then two certain points are selected from the RRT path (390) and an intermediate path P2 connecting the two certain paths is generated (400; see FIG. 14).

Nodes $n_1$, $n_2$, $n_3$ and $n_4$ obtained by dividing the intermediate path P2 by a constant interval are projected (410; see FIG. 15) and a determination is made as to whether the projection nodes $n_{1\text{-}projected}$, $n_{2\text{-}projected}$, $n_{3\text{-}projected}$ and $n_{4\text{-}projected}$ satisfy a kinematic constraint (collision avoidance, joint limit, a constraint on a working space, a torque limit or the like) (420).

The method of projecting the nodes $n_1$, $n_2$, $n_3$ and $n_4$ divided by the constant interval refers to Equation 2.

If it is determined that the projection nodes $n_{1\text{-}projected}$, $n_{2\text{-}projected}$, $n_{3\text{-}projected}$ and $n_{4\text{-}projected}$ do not satisfy the constraint in operation 420, the method progresses to operation 390 and the subsequent operation thereof is performed.

In contrast, if it is determined that the projection nodes $n_{1\text{-}projected}$, $n_{2\text{-}projected}$, $n_{3\text{-}projected}$ and $n_{4\text{-}projected}$ satisfy the constraint in operation 420, the two certain points are inserted into the path and the RRT path of the shortcut is stored (430). Then, the method returns to operation 380 and the subsequent operation thereof is performed until the end condition is satisfied.

In contrast, if it is determined that the end condition is satisfied in operation 380, a smooth RRT path is generated while satisfying the constraint by operations 390 to 430 (440).

Accordingly, the path planning generator 210 generates the path of the manipulator 130 by the graph searching operation after smoothing the RRT path of the manipulator 130 by the above-described method. Thereafter, the robot controller 230 controls the driving unit 240 according to the generated path to control the motion of the manipulator 130.

According to the example embodiments, the zigzag path generated by the RRT algorithm may be smoothed while satisfying the constraint.

Figure 17:
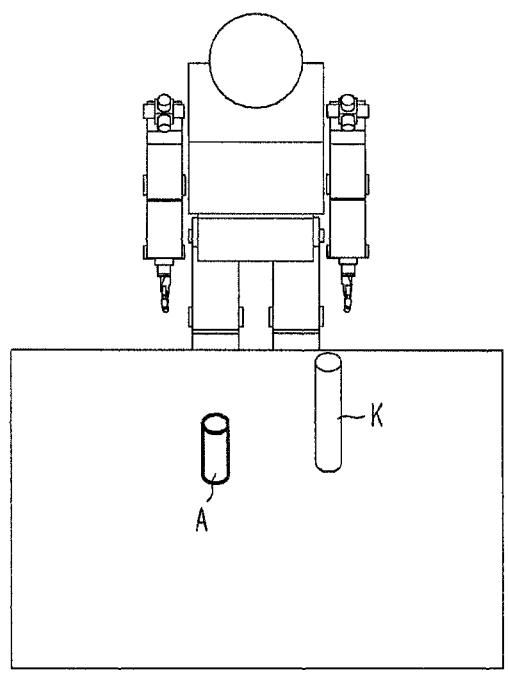
FIGS. 17 to 19 are views showing a simulation operation of an RRT path smoothing method suggested by example embodiments in a working space.
Figure 18:
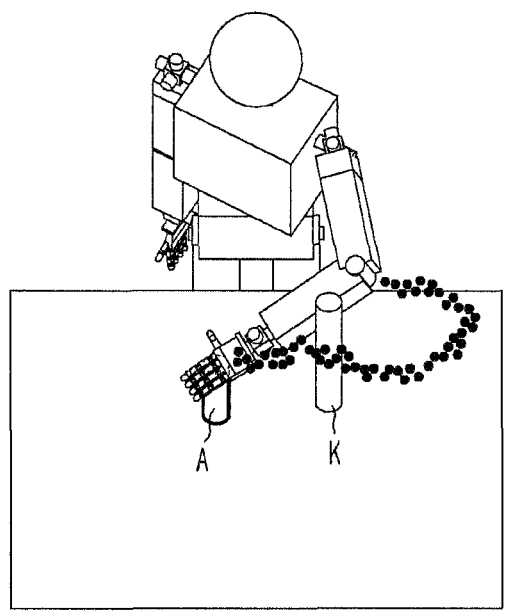
Figure 19:
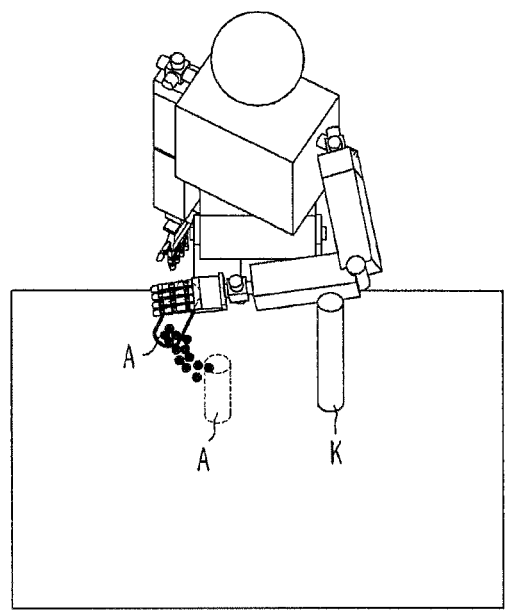

FIGS. 17 to 19 are views showing a simulation operation of an RRT path smoothing method suggested by example embodiments in a working space.

FIG. 17 shows the configuration (start point S) at the initial position before the manipulator 130 performs the task. As shown, an object A and an obstacle K are placed on a table.

FIG. 18 shows a process of grasping the object A using the RRT path smoothing method suggested by the example embodiments, and FIG. 19 shows a process of moving the object A in a z direction (height direction) using the RRT path smoothing method suggested by the example embodiments.

Figure 20:
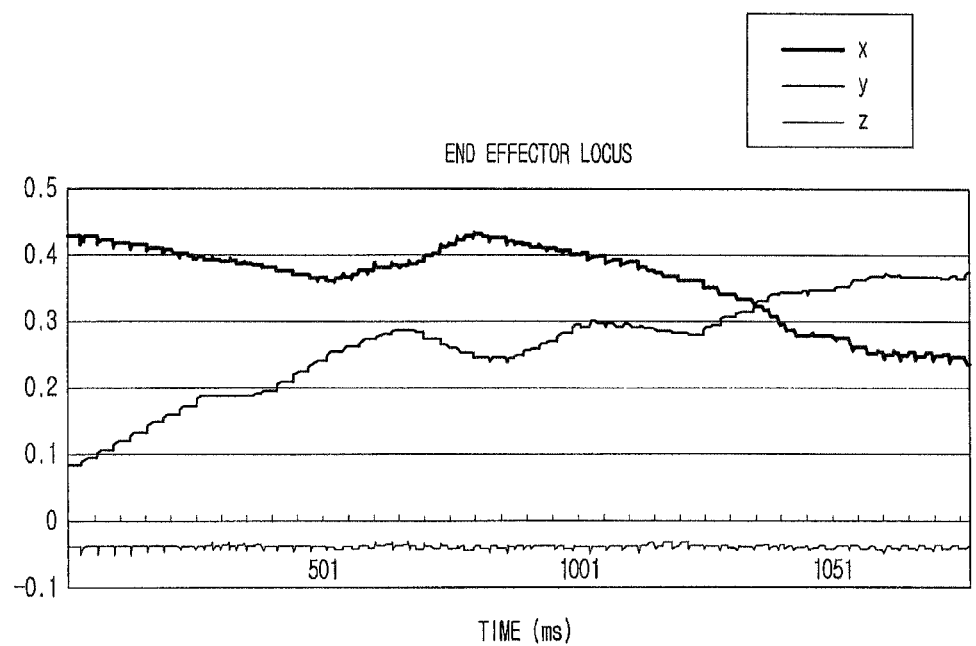
FIGS. 20 to 22 are views showing the locus of an end effector to show a simulation result of an RRT path smoothing method suggested by example embodiments and a simulation result of a method of the related art.
Figure 21:
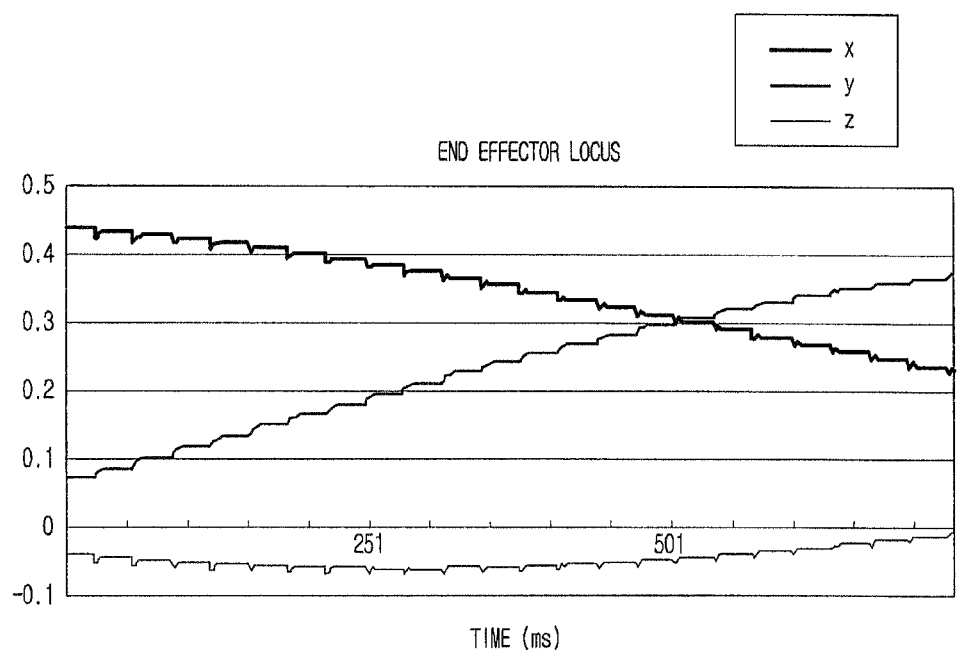
Figure 22:
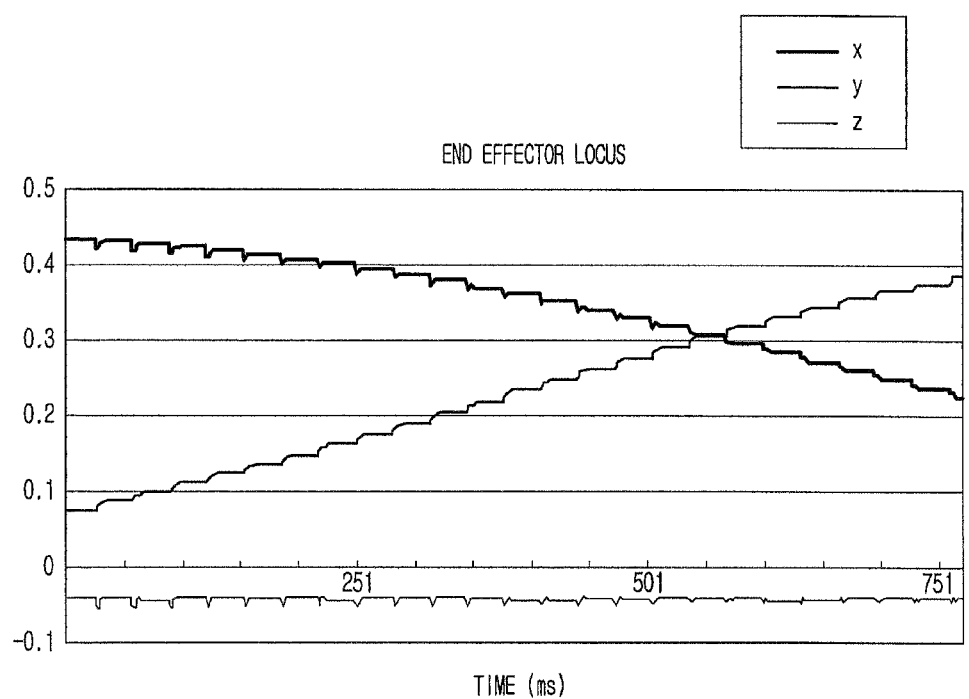

The comparison between the simulation result of the example embodiments and the simulation result of the related art is shown in FIGS. 20 to 22.

FIGS. 20 to 22 are views showing the locus of an end effector to show a simulation result of an RRT path smoothing method suggested by example embodiments and a simulation result of a method of the related art.

FIG. 20 is a graph showing the locus of the end effector 131 when the RRT path is not smoothed. The constraint of the z direction is satisfied, but a reciprocating motion in x and y directions may occur. The time consumed performing the task by the end effector 131 is 15 seconds or more.

FIG. 21 is a graph showing the locus of the end effector when the RRT path is smoothed by the method of the related art. The reciprocating motion in the x and y directions is reduced and the time is also reduced by ⅓ or more. However, the constraint of the z direction is not satisfied.

FIG. 22 is a graph showing the locus of the end effector when the RRT path is smoothed by the method suggested by the example embodiments. The reciprocating motion in the x and y directions is reduced, and the time is also reduced by ½ or more. The constraint of the z direction is satisfied.

Figure 23:
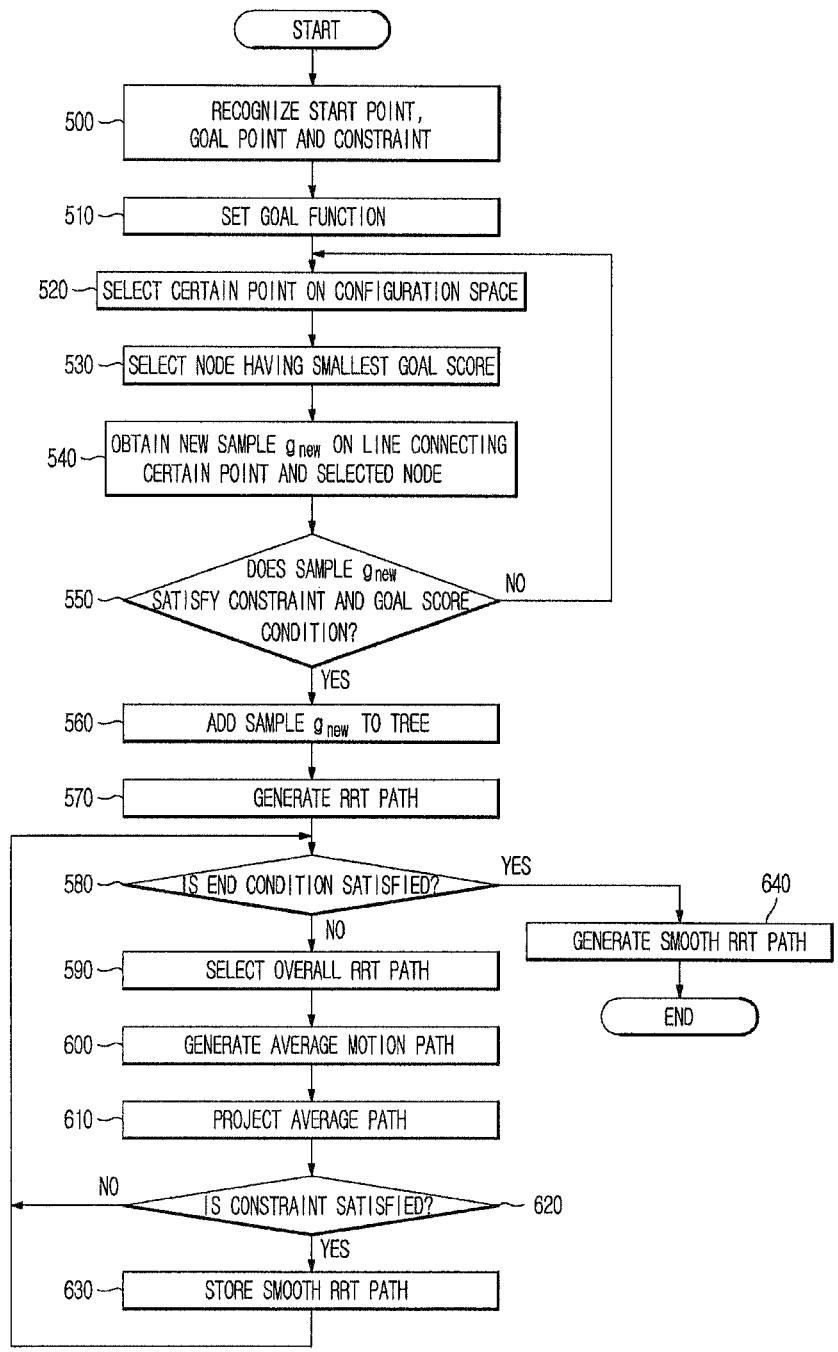
FIG. 23 is a flowchart illustrating an RRT path smoothing method in a robot according to example embodiments. The description of the same portions as FIG. 16 will be omitted.

FIG. 23 is a flowchart illustrating an RRT path smoothing method in a robot according to example embodiments, however the description of the same portions as FIG. 16 will be omitted.

In FIG. 23, the path planning generator 210 recognizes a start point S, a goal point G, a constraint (collision avoidance, joint limit or the like) to avoid obstacles K placed between the start point S and the goal point G in a C-space (500; see FIG. 6).

In addition, the path planning generator 210 sets a goal function which is a function according to a distance between the start point S and the goal point G and a directional difference thereof using Equation 1 (510).

Subsequently, the path planning generator 210 randomly samples a certain point g in the C-Space with the recognized start point S, goal point G and constraint (520; see FIG. 7).

A node having a smallest goal score is selected from nodes belonging to the tree T in the randomly sampled certain point g (530). The randomly sampled certain point g and the node having the smallest goal score are connected by a dotted virtual line to obtain a new sample $g_{new}$ (540; see FIG. 8). In addition, it is determined whether the new sample $g_{new}$ satisfies the constraint and the goal score condition (550).

If it is determined that the sample $g_{new}$ satisfies the constraint and the goal score condition in operation 550, then the new sample $g_{new}$ is added to the tree (560; see FIG. 9). The above-described process is repeatedly performed until the new sample $g_{new}$ is constantly extended (see FIG. 10).

The tree extension process is repeatedly performed to generate the RRT path of the manipulator 130, as shown in FIG. 12 (570). The generated RRT path may substantially extend in the vertical direction to become a detour or zigzag path.

Accordingly, the path planning generator 210 determines whether an end condition (maximum repetition number and maximum time) is satisfied in order to lessen the high frequency characteristics of the RRT path and to smooth the RRT path while satisfying the constraint (580).

If it is determined that the end condition is not satisfied in operation 580, then the overall RRT path, including all the nodes is selected (590) and an average motion path is generated (600). This method refers to a low-pass filtering method of correcting the overall RRT path without filtering. Thus, a collision with the constraint may occur.

Accordingly, the average path (in detail, a plurality of nodes in the average motion path) is projected (610) and a determination is made as to whether the kinematic constraint (collision avoidance, joint limit, constraint on a working space, torque limit, or the like) is satisfied (620).

If it is determined that the constraint is not satisfied in operation 620, the method returns to operation 580 and the subsequent operation thereof is performed.

In contrast, if it is determined that the constraint is satisfied in operation 620, the projected average path is inserted, the smooth RRT path of a shortcut is stored (630), the method returns to operation 580, and the subsequent operation thereof is performed until the end condition is satisfied.

In contrast, if the end condition is satisfied in operation 580, the smooth RRT path is generated while satisfying the kinematic constraint by operations 590 to 630 (640).

Accordingly, the path planning generator 210 generates the path of the manipulator 130 by the graph searching operation after smoothing the RRT path of the manipulator 130 by the above-described method. Thereafter, the robot controller 230 controls the driving unit 240 according to the generated path to control the motion of the manipulator 130.

According to the example embodiments, the zigzag path generated by the RRT algorithm may be smoothed while satisfying the constraint.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments of the present invention have been shown and described, it should be appreciated by those skilled in the art that changes may be made in these embodiments without departing from the principles and spirit of the disclosure, the scope of which is defined in the claims and their equivalents.

What is claimed is:

1. A method of planning a path of a robot, the method comprising:
    forming, by at least one processor, a configuration space having a start point, a goal point and a constraint to generate a motion path of a manipulator of the robot;
    generating, by the at least one processor, a Rapidly-exploring Random Tree (RRT) path connecting the start point and the goal point while satisfying the constraint on the configuration space;
    selecting first and second points from the RRT path;
    generating, by the at least one processor, an intermediate path connecting the first and second points selected from the RRT path;
    projecting, by the at least one processor, the intermediate path and determining when the constraint on the configuration space is satisfied; and
    storing, by the at least one processor, the two certain points in the RRT path to smooth the RRT path if the constraint on the configuration space is satisfied.

2. The method according to claim 1, wherein the start point is a node obtained by forming a configuration on the configuration space at an initial position before the manipulator of the robot performs a task.

3. The method according to claim 1, wherein the goal point is a node obtained by forming a configuration on the configuration space at a goal position where the manipulator of the robot performs a task.

4. The method according to claim 1, wherein the projecting of the intermediate path includes:
    obtaining a constraint on a working space of the manipulator of the robot;
    comparing the constraint on the working space with the constraint on the configuration space to calculate an error on the working space; and
    projecting nodes of the intermediate path to correct the error on the working space.

5. The method according to claim 4, wherein the nodes of the intermediate path are a plurality of nodes obtained by dividing the intermediate path by a constant interval.

6. The method according to claim 5, wherein the determining of whether the constraint on the configuration space is satisfied includes determining whether the nodes of the intermediate path satisfy the constraint on the configuration space.

7. At least one non-transitory computer readable medium comprising computer readable instructions that control at least one processor to implement the method of claim 1.

8. A method of planning a path of a robot, the method comprising:
    forming, by at least one processor, a configuration space having a start point, a goal point and a constraint to generate a motion path of a manipulator of the robot;
    generating, by the at least one processor, a Rapidly-exploring Random Tree (RRT) path connecting the start point and the goal point while satisfying the constraint on the configuration space;
    low-pass filtering, by the at least one processor, the overall RRT path;
    projecting, by the at least one processor, the low-pass filtered path and determining if the constraint on the configuration space is satisfied; and
    storing, by the at least one processor, the projected path in the RRT path to smooth the RRT path if the constraint on the configuration space is satisfied.

9. The method according to claim 8, wherein the projecting of the low-pass filtered path includes:
    obtaining a constraint on a working space of the manipulator of the robot;
    comparing the constraint on the working space with the constraint on the configuration space to calculate an error on the working space; and
    projecting nodes of the low-pass filtered path to correct the error on the working space.

10. The method according to claim 9, wherein the nodes of the low-pass filtered path are all nodes on the low-pass filtered path.

11. At least one non-transitory computer readable medium comprising computer readable instructions that control at least one processor to implement the method of claim 8.

12. An apparatus planning a path of a robot, the apparatus comprising:
    a recognizer configured to recognize a start point and a goal point respectively corresponding to an initial configuration and a goal configuration of a manipulator of the robot; and
    a path planning generator configured to form a configuration space to generate a motion path of the manipulator of the robot, to generate a Rapidly-exploring Random Tree (RRT) path connecting the start point and the goal point while satisfying a constraint on the configuration space, and to project the RRT path on a working space of the manipulator of the robot to smooth the RRT path,
    wherein the path planning generator selects first and second points from the RRT path and generates an intermediate path connecting the first and second points selected from the RRT path.

13. The apparatus according to claim 12, wherein the path planning generator further projects nodes obtained by dividing the intermediate path by a constant interval responsive to the constraint on the configuration space, and stores the two certain points in the RRT path to smooth the RRT path if the nodes of the intermediate path satisfy the constraint on the configuration space.

14. The apparatus according to claim 13, wherein the path planning generator obtains a constraint on a working space of the manipulator of the robot, compares the constraint on the working space with the constraint on the configuration space to calculate an error on the working space, and projects nodes of the intermediate path to correct the error on the working space.

15. The apparatus according to claim 12, wherein the path planning generator low-pass filters the overall RRT path to produce a low-pass filtered path, projects the low-pass filtered path responsive to the constraint on the configuration space, and stores the projected path in the RRT path to smooth the RRT path if the projected path satisfies the constraint on the configuration space.

16. The apparatus according to claim 15, wherein the path planning generator obtains a constraint on a working space of the manipulator of the robot, compares the constraint on the working space with the constraint on the configuration space to calculate an error on the working space, and projects nodes of the low-pass filtered path to correct the error on the working space.

* * * * *